Figure 1:
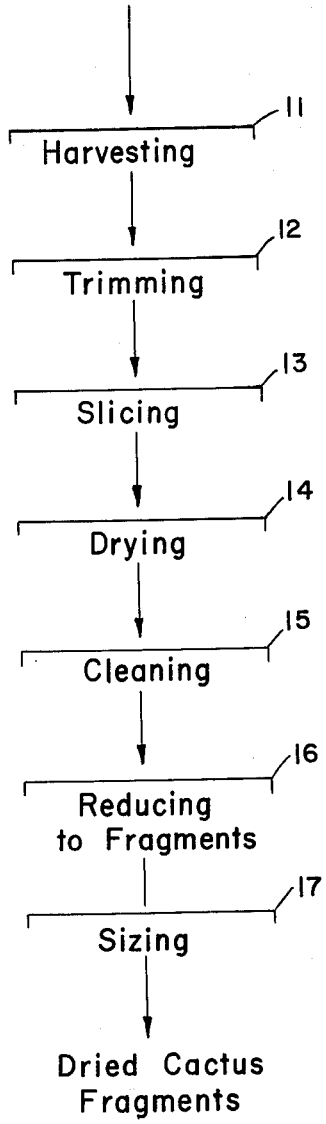

Oct. 9, 1962     J. H. FORKNER     3,057,738

CACTUS PRODUCT AND METHOD

Filed Feb. 18, 1960

*INVENTOR.*
JOHN H. FORKNER
BY
*Flehr & Swain*
ATTORNEYS

United States Patent Office 3,057,738
Patented Oct. 9, 1962

3,057,738
CACTUS PRODUCT AND METHOD
John H. Forkner, Fresno, Calif., assignor to The Pillsbury Company, Minneapolis, Minn., a corporation of Delaware
Filed Feb. 18, 1960, Ser. No. 9,565
8 Claims. (Cl. 99—204)

This invention relates generally to the manufacture of an improved cactus product, and particularly to such a product useful as a base in the compounding of various foods or ingredients of foods.

As is well known, there is considerable commercial demand for a high quality base material which can be used as a carrier for various food materials such as syrups, fruit flavors, concentrates, and the like. The usefulness and range of application of such a base is dependent largely on its ability to carry substantial amounts of added ingredients, as for example, sugar, and also on its compatibility with various foods. In many applications, as in the baking industry, its usefulness increases with its ability to retain a desired degree of firmness during baking or other processing and to retain a desired physical state after the processing.

Heretofore, no base material has proved entirely satisfactory, and most are subject to a number of distinct shortcomings. By way of illustration: many tend to dissolve in hot or cold water so that their effectiveness as a carrier is lost; most tend to liquefy or otherwise lose their identity at elevated temperatures, particularly if the heating is prolonged; many other have insufficient carrying properties for added ingredients such as fruit flavors, sugar, etc., or tend to lose their carrying properties during processing to the final product; or they are easily oxidized into undesirable form, for example by burning or caramelization. In addition, many carriers have a strong natural flavor that cannot be masked, even by added ingredients, or have a characteristic color which is undesired in the finished product, making it impossible to provide compounded products possessing a clear natural color.

In general, it is an object of the present invention to overcome the above and additional difficulties by providing a base material of unusual adaptability in the food processing art.

Another object of the invention is to provide a new base material derived from cactus which possesses novel characteristics including the ability to assimilate up to 15 times its weight of added ingredients, a bland flavor which readily lends itself to the assimilation of fruit syrups, concentrates and flavors, and a light color whereby it can be used in products requiring an attractive clear color.

Another object of the invention is to provide such a base material that is capable of functioning as a stabilizer to prevent alteration of the flavor or appearance or color of various food materials, and to retard their breakdown or spreading upon heating, or other processing.

Another object is to provide a base stabilizer or carrier which blends readily with various foods while retaining its physical identity, and which will assimililate the principal characteristics of various added foods, flavorings, concentrates, syrups, etc. in appearance, odor, taste and color.

Another object is to provide a base material in fragment form that is capable of retaining such form during high or low temperature processing, which will not burn or discolor at exposed surfaces, and which is incapable of being absorbed into various foods with which it is associated.

Additional objects and advantages of the invention will appear from the following description wherein preferred embodiments are set forth in detail in conjunction with the flow sheets of the accompanying drawing.

In terms of broad inclusion, the present invention relates to a dehydrated cactus product in fragment form which is particularly suited for use as a base material in the food processing and baking arts. It also relates to a process for producing such dehydrated fragment product from the interior of cacti, particularly that group of cacti known as "barrel" cactus (e.g., members of the tribe Cereeae, such as Ferocactus and Echinocactus). In producing the cactus fragment, I prepare dehydrated wafers of the type disclosed in my copending application Serial No. 9,509, filed February 18, 1960. As therein described, the cacti are harvested and trimmed and the interior pulp cut and sliced to a wafer thickness of between about $\frac{1}{16}$ to $\frac{5}{8}$ inch. The sliced wafers are subsequently air dried, preferably by exposure to the sun, to a moisture content of the order of about 5% by weight. The dried slices or wafers processed in this fashion are characterized by a hard protective skin on their outer surfaces which tends to resist penetration of moisture and rehydration.

In carrying out the instant process, the dehydrated wafers are first cleaned, for example by washing in water, in a manner which will not cause appreciable hydration of the wafers. The celaned wafers are next cracked or otherwise reduced to wafer-like fragments causing portions of the interior of the fragments to be exposed at the cracked surfaces. In a final step, the fragments are subjected to sizing operations, for example screening, to separate a final clean fragment product of a size particularly adapted to rehydration, and to subsequent assimilation of added ingredients.

The cactus fragment products as described above possess a number of unique properties. They will not disperse or dissolve in hot or cold water, oils, or other food solvents. They have side surface which retain the hard skin produced in the original drying, and which serve to protect the fragments and to provide mechanical strength to resist breakage in handling and packaging. On the other hand, the cactus fragments are capable of readily assimilating large amounts of water or other aqueous liquids, as well as various oils and similar liquids, through their exposed or fractured edge surfaces. In the presence of heat, they will assimilate such liquids in amounts up to 15 times their own weight, easily and without prolonged heating. By way of specific illustartion, the cactus fragments will rehydrate between 10 to 12 times their original weight upon 20 to 60 minutes boiling at atmospheric pressure in water. This ability to rehydrate or to assimilate liquids apparently stems from an internal sponge-like cellular composition of the cactus material achieved during the initial drying and which is exposed during the formation of the fragments. The cactus fragments also contain natural anti-oxidants which impart to the fragment an unexpected ability to resist any alteration in physical characteristics, flavor, appearance and color of the fragments, even upon prolonged heating to temperatures as high as 250° to 300° F. This is a feature of particular importance when the fragments are used as a base material in products requiring processing at elevated temperatures (e.g., bakery products), since the fragments do not lose their carrying capacity nor break down or liquefy at the processing temperatures. The cactus fragments also possess a desirable light color and a bland flavor which contributes further to their usefulness as a base in the compounding of various foods.

In the flow sheet of FIGURE 1, I have shown a preferred procedure for processing of the dehydrated cactus wafers (derived as in my copending application, Serial No. 9,509), to produce the novel cactus fragment product of the instant application. Thus I show the harvesting and trimming of the cactus in Steps 11 and 12, and the slicing of the cactus in Step 13 to produce an optimum thickness for effective, uniform drying. The slices are dried in Step 14 to produce the novel dehydrated cactus wafers described and claimed in my aforementioned copending application. Drying can be accomplished in many ways, as by forced drafts of heated air or in connection with vacuum processing, but preferably is accomplished by about 8 to 12 hours open exposure to the sun.

In Step 15 I show the cleaning of the dehydrated wafers to remove any surface contaminants or impurities which may have collected during transport of the wafers to the processing area. One method of cleaning is to wash the fragments in a bath or spray of warm water. The skin which forms naturally on the surface of the wafers during initial drying retards any substantial hydration or absorption of water during this processing. Cleaning can also be accomplished pneumatically as by air jets or similar means. It will be understood that the drying of the wafers in Step 14 particularly by sun drying, achieves a hardening of the wafers to produce a tough, hard outer surface which can be readily cleaned in the manner indicated. The drying usually reduces the thickness of the wafers to a final thickness of about $\frac{1}{32}$ to $\frac{3}{8}$ inch.

In the next operation, Step 16, the clean dry cactus wafers are reduced to the fragment size, for example, by breaking or cracking in a hammer mill. In a typical operation, cracking is accomplished in a Rietz vertical hammer mill to produce fragments having a maximum dimension no greater than about $\frac{5}{8}$ inch and preferably between about $\frac{1}{4}$ and $\frac{1}{2}$ inch. As previously noted, the resulting wafer-like fragments have side surfaces which retain the hard skin produced during the drying, and which serve to mechanically stabilize and protect the fragments. At the fractured edge surfaces, dry, collapsed internal cells of the cactus material are exposed, and these surfaces make possible accelerated assimilation of liquids into the fragments upon subsequent processing. The resulting fragments have a natural white color and a clean, generally pleasing appearance.

The sizing in Step 17 can be carried out in conventional manner, for example by screening. The screened fragments should have a size of at least $\frac{1}{8}$ inch or greater, and preferably should be capable of being retained on a No. 3 mesh screen (Tyler standard series). The separation of the fines from the fragments, in Sept 17, is of importance to the invention, since the fines tend to agglomerate into lumps or masses which are incapable of providing the desired characteristics of the fragment product.

Figure 2:
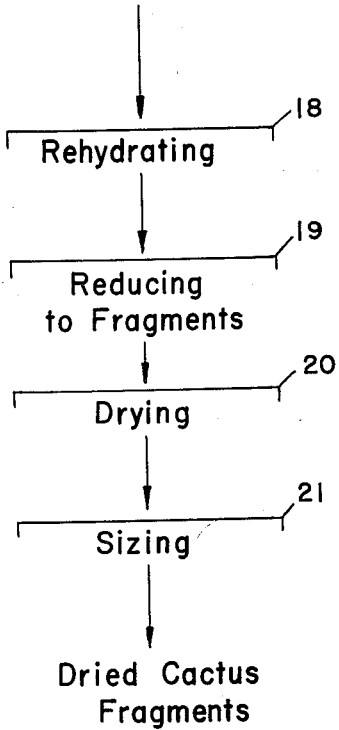

The flow sheet of FIGURE 2 illustrates a modification of the process wherein clean dried wafers (for example from Step 15) are rehydrated prior to processing to produce the fragments. Although substantially moisture resistant the dried wafers can be slowly rehydrated in Step 18 by boiling at atmospheric temperatures in water (e.g., one to two hours or more), such prolonged boiling producing wafers having a moisture content of the order of 90 to 95%. Thereafter, the moist wafers can be comminuted or otherwise reduced in size in Step 19 to the fragment form. These fragments can be used as is or dehydrated in Step 20 for use in various food processes and products. The modified process is advantageous in that it produces a minimum of fines in the sizing step 21.

As noted above, the dehydrated cactus fragments of the present invention possess a number of highly desirable characteristics and properties which render them unusually adaptable for use as a base material in the food processing arts. The following examples are illustrative of the wide range of usefulness and application of the cactus fragments.

*Example 1*

"Barrel" cactus (Variety—Echinocactus, Wislizinii) was harvested, the external skin and spines trimmed away, and the interior cut and sliced to an average thickness of about $\frac{1}{4}$ inch. The slices were dried in the sun with periodic turning for about 10 hours, to produce dried wafers having a moisture content of about 5%. The dried wafers were then stored. At a later date, the wafers were removed from storage and washed with water (about 75° F.) and allowed to drain. Upon analysis, the moisture content was shown to be about 5%. The clean wafers were then cracked in a Rietz vertical hammer mill (800 r.p.m., 50% screened) to produce fragments having a maximum diameter of less than $\frac{1}{2}$ inch. The resulting fragments were screened through a No. 3 mesh screen (Tyler standard series), and the retained fragments immersed in water at 190° F. for a period of 1 hour. Upon draining the moisture content of the fragments was found to be about 91%.

*Example 2*

Sun dried cactus wafers derived from the process of Example 1 were cleaned pneumatically by jets of air directed against their side surfaces. The cleaned wafers were found to have a moisture content of 5%. The wafers were then reduced to fragments and screened, as in Example 1, and immersed in water at 212° F. for a period of 30 minutes. The moisture content of these fragments was determined to be 92%.

*Example 3*

Clean dry cactus wafers derived as in Example 1 were slowly rehydrated by boiling in water at 212° F. for a period of about 150 minutes to produce wafers having a moisture content of approximately 93%. The moist wafers were reduced in size on an Urschel cut machine to produce fragments of less than $\frac{1}{2}$ inch in size. The resulting fragments were then dried to about 5% moisture under reduced pressure (26 inches of Hg). Upon subsequently boiling the fragments in water at atmospheric temperatures for a period of one hour, the moisture content of the fragments was determined to be about 90%.

*Example 4*

Wafer-like fragment products derived from the sun dried interior of ferocactus, and having an average dimension of approximately $\frac{3}{8}$ inch, were boiled in water for about 15 minutes. As a result of this processing, the moisture content of the fragments was increased from about 5% to an average of about 89%. Upon draining excess water, the reconstituted cactus fragments weighed about 92.5 grams for each 10 grams of initial dried fragments.

*Example 5*

In processing identical to that of Example 4, cactus fragments were boiled for 30 minutes in water and, after draining, were found to have a moisture content of 91.5% and a reconstituted weight of 117.7 grams for each 10 grams of fragments. Boiling for 30 minutes produced a moisture content of about 92%, and a reconstituted weight of 137.5 grams.

*Example 6*

One hundred grams of cactus fragments from Example 4 were boiled at atmospheric pressure with a 20% syrup solution comprising approximately equal amounts of Karo syrup and granulated sugar syrup. Boiling contact was maintained for a period of about 30 minutes. The fragments were drained of excess syrup and the process repeated with 40% syrup, 60% syrup and with 80% syrup. After drying to 90% solids, the final product was found to contain about 70% sugar on a dry solids basis.

*Example 7*

The processing of Example 6 was repeated with the addition of various fruit colors and flavors, including cherry, strawberry, pineapple, etc., which were readily assimilated.

Example 8

Cactus fragments hydrated as in Example 5, and having a moisture content of about 91%, were contacted with honey at a temperature of 210° F. for a period of about 40 minutes. The honey was readily assimilated in the fragments, with displacement of some of the water, with the result that the fragments assumed a golden honey-like appearance and a strong honey flavor.

Example 9

Vacuum dried cactus fragments having a moisture content of about 5% were boiled in water at atmospheric pressure for 30 minutes, and drained to remove excess water. The fragments were added to a 20% syrup solution comprising one-half Karo and one-half granulated sugar and boiled for 20 minutes at atmospheric pressure. Contact with the syrup was continued for 2 hours and the fragments drained overnight. The process was repeated within successive 24 hour periods with a 40% syrup, a 60% syrup, and an 80% syrup. The resulting fragment products were found to contain about 67% sugar on a dry solids basis.

Example 10

Rehydrated cactus fragments derived from Example 5, and having a moisture content of 92%, were incorporated into a conventional bakery dough and placed in an oven at a temperature of 290° F. for a period of 2 hours. Upon removal from the oven, the fragments displayed no evidence of burning or discoloration, and remained soft. The resulting baked dough was observed for a period of 30 days. The fragments retained their identity, color and flavor, and there was no tendency towards color run or breakdown.

Example 11

The processing of Example 10 was repeated, except that cactus fragments derived from Example 6 were employed. Upon removal from the oven, no discoloration or burning of the fragments was observed nor any tendency toward caramelization of the sugar. The fragments remained soft.

The above examples are only illustrative of the obviously very great number of specific uses of the cactus fragments of the invention, and many different uses than those described are clearly within the range of utility of the fragment products. For example, the assimilation of various oils such as nut oils, and the like, can be obtained with the fragments, as well as the assimilation of various food liquids such as meat juices, vegetable extracts, etc. While it may be understood that the essence of my invention is the discovery of the unique properties and characteristics possessed by the dehydrated cactus fragments, the disclosures herein as to use should be regarded as primarily illustrative and not in any sense limiting.

I claim:

1. In a process for the manufacture of a cactus product from hydrous pulpy material comprising the interior of fresh cactus, the steps of drying thin slices of said material to impart a dry spongy cellular characteristic to the slices, said slices having a thickness before drying between about $1/16$ to $5/8$ inch, said drying simultaneously serving to produce thin dry wafers having a protective skin on their outer surfaces, and fragmenting said wafers to produce relatively smaller fragments, side portions of which are protected and strengthened by said skin.

2. In a process for the manufacture of a cactus product from hydrous pulpy material comprising the interior of fresh cactus, the steps of drying thin slices of said material to produce thin dry wafers having a protective skin on their outer surfaces that resists moisture penetration, said slices having a thickness before drying between about $1/16$ to $5/8$ inch, cracking said wafers into smaller pieces to produce readily hydratable fragments having unprotected edge surfaces, and separating the fragments from any finely divided material produced by the cracking.

3. In a process for the manufacture of a cactus product from hydrous pulpy material comprising the interior of fresh cactus, the steps of sun drying thin slices of said material to impart a dry spongy cellular characteristic to the same, said slices having a thickness before drying between about $1/16$ to $5/8$ inch, said drying simultaneously serving to produce thin dry wafers having a protective skin on their outer surfaces adapted to resist moisture penetration, and cracking said wafers to produce smaller dry fragments each having fractured edge surfaces and portions of said skin.

4. In a process for the manufacture of a cactus product from hydrous pulpy material comprising the interior of fresh cactus, the steps of drying thin slices of said material to impart a dry spongy cellular characteristic to the same, said slices having a thickness before drying between about $1/16$ to $5/8$ inch, said drying simultaneously serving to produce thin dry wafers having a protective skin on their outer surfaces, rehydrating said wafers by contact with water, fragmenting the rehydrated wafers to produce wet fragments, and drying the rehydrated fragments to produce dry fragments.

5. As a new article of manufacture, a dehydrated cactus fragment composed essentially of dry cellular spongy cactus material derived from the interior of cactus, said fragment having spaced apart side surfaces in the form of hard dry protective skins which provide mechanical strength and protection to the fragment, the cellular cactus material being exposed on the edge surfaces between the side surfaces, said fragment being further characterized by its ability to absorb large amounts of liquids.

6. As a new article of manufacture, dehydrated cactus fragments composed essentially of dry cellular spongy cactus material derived from the interior of cactus, said fragments having side surfaces comprising protective skins which impart mechanical strength to the fragments, said fragments being free of fines and characterized by a maximum dimension within the range of from about $1/8$ to $5/8$ inch, a bland flavor, and the ability to assimilate large amounts of liquids.

7. As a new article of manufacture, dehydrated cactus fragments comprising essentially dry material derived from the interior of fresh cactus, said fragments having protective, relatively moisture-resistant side surfaces, internal and edge portions of said fragments being composed essentially of dry cellular spongy cactus, said fragments being further characterized by a light color, the ability to assimilate liquids in amounts up to 15 times their weight, and the ability to resist alteration of size, flavor, appearance and color upon sustained heating at elevated temperatures.

8. A dehydrated cactus product in fragment form, said product being derived from the sun dried interior pulp of fresh cactus, said fragments having internal and edge portions of a dry cellular spongy character, said fragments being further characterized by a light color, an ability to assimilate up to 15 times their weight of liquids, and anti-oxidant properties providing an enhanced resistance to physical change and to alternation of flavor, color, and appearance at elevated temperatures up to about 300° F.

References Cited in the file of this patent

UNITED STATES PATENTS

| | | |
|---|---|---|
| 2,733,145 | Karr | Jan. 31, 1956 |
| 2,901,359 | Forkner | Aug. 25, 1959 |